United States Patent
Gargi et al.

(10) Patent No.: US 9,078,048 B1
(45) Date of Patent: Jul. 7, 2015

(54) FINDING AND POPULATING SPATIAL AD SURFACES IN VIDEO

(75) Inventors: Ullas Gargi, Los Altos, CA (US);
Pranab Mohanty, Tampa, FL (US)

(73) Assignee: Google Inc., Mountain View, CA (US)

( * ) Notice: Subject to any disclaimer, the term of this patent is extended or adjusted under 35 U.S.C. 154(b) by 1404 days.

(21) Appl. No.: 12/173,714

(22) Filed: Jul. 15, 2008

(51) Int. Cl.
H04N 7/10 (2006.01)
H04N 7/025 (2006.01)
H04N 21/81 (2011.01)
H04N 7/16 (2011.01)

(52) U.S. Cl.
CPC ............. *H04N 21/812* (2013.01); *H04N 7/165* (2013.01)

(58) Field of Classification Search
USPC ........ 725/32, 34–36; 382/103, 108, 154, 165; 705/14.4, 14.41, 14.46, 14.49, 14.53, 705/14.68, 14.69, 14.71, 14.73; 715/723, 715/725
See application file for complete search history.

(56) References Cited

U.S. PATENT DOCUMENTS

| | | | | | |
|---|---|---|---|---|---|
| 5,915,044 | A * | 6/1999 | Gardos et al. | ................. | 382/236 |
| 5,974,398 | A * | 10/1999 | Hanson et al. | ............. | 705/14.64 |
| 6,173,317 | B1 * | 1/2001 | Chaddha et al. | ............. | 709/219 |
| 6,201,546 | B1 * | 3/2001 | Bodor et al. | ................... | 345/620 |
| 6,297,853 | B1 * | 10/2001 | Sharir et al. | ................. | 348/589 |
| 7,979,877 | B2 * | 7/2011 | Huber et al. | ..................... | 725/36 |
| 2001/0023436 | A1 * | 9/2001 | Srinivasan et al. | ............ | 709/219 |
| 2002/0037103 | A1 * | 3/2002 | Hong et al. | ................... | 382/173 |
| 2002/0090133 | A1 * | 7/2002 | Kim et al. | ..................... | 382/164 |
| 2002/0138844 | A1 * | 9/2002 | Otenasek et al. | ............... | 725/87 |
| 2003/0188308 | A1 * | 10/2003 | Kizuka | ........................... | 725/32 |
| 2005/0078853 | A1 * | 4/2005 | Buehler et al. | ................. | 382/103 |
| 2006/0130095 | A1 * | 6/2006 | Willis et al. | ...................... | 725/42 |
| 2006/0294538 | A1 * | 12/2006 | Li et al. | ............................. | 725/24 |
| 2008/0066107 | A1 * | 3/2008 | Moonka et al. | .................. | 725/42 |
| 2009/0037263 | A1 * | 2/2009 | Patil | ................................ | 705/14 |
| 2009/0249386 | A1 * | 10/2009 | Shan et al. | ....................... | 725/32 |
| 2009/0276805 | A1 * | 11/2009 | Andrews, II et al. | ........... | 725/35 |
| 2009/0328113 | A1 * | 12/2009 | van de Klashorst | ............ | 725/87 |

OTHER PUBLICATIONS

"Welcome to Zunavision," Zunavision, 2009, [online] [Retrieved on Jul. 21, 2009] Retrieved from the Internet <URL:http://www.zunavision.com/>.
"Zunavision," Posted on YouTube, 2009, [online] [Retrieved on Jul. 21, 2009] Retrieved from the Internet <URL:http://www.youtube.com/watch?v=eNyXwC5YUsc>.
Felzenszwalb, P., et al., "Efficient Graph-Based Image Segmentation," International Journal of Computer Vision, Sep. 2004, 26 pages, vol. 59, No. 2.
Li, L., et al., "Foreground Object Detection From Videos Containing Complex background," ACM-MM, Nov. 2003, pp. 2-10.

* cited by examiner

*Primary Examiner* — Jason Salce
(74) *Attorney, Agent, or Firm* — Fenwick & West LLP (57) ABSTRACT

A video hosting web site receives uploaded video content and processes the video to determine ad surfaces. The ad surfaces comprise spatio-temporal regions of the video suitable for placement of advertisement such as background surfaces or other regions of low interest. The uploaded video and ad surfaces are stored to a video database that is accessible to viewers visiting the video hosting web site. When a shared video is requested, the video hosting site provides the requested video content together with the ad surfaces and advertisements. The advertisements are blended with the ad surfaces in the video at playtime so that the advertisements appear as part of the video scene. This allows the video hosting web site to present advertisements to the viewer without significantly distracting the viewer from the requested content.

28 Claims, 11 Drawing Sheets

FINDING AND POPULATING SPATIAL AD SURFACES IN VIDEO

BACKGROUND

1. Field of Art

The invention generally relates to video sharing over a network, and more specifically to displaying advertisements in shared videos.

2. Description of the Related Art

The online sharing of video content has developed into a worldwide phenomenon, supported by dozens of websites. On average, many thousands of videos are posted every day, and this number is increasing as the tools and opportunities for capturing video become easier to use and more widespread. Shared video content provides good opportunities to present advertising material to viewers along with the requested video content. Such advertisements can generate revenue for the video hosting site, the video content providers, or both.

In one conventional technique, advertisements are delivered with requested content by inserting advertisements in the video content window before or after playback of the requested content. For example, a viewer may receive 15-30 seconds of advertising content prior to playback of the video or following conclusion of the video. Alternatively, playback of the requested content may be temporarily interrupted to insert advertising content. Playback of the requested content is then resumed following the advertising time slot. In another conventional technique, advertising content is instead displayed separately from the requested video content. For example, an advertisement may be displayed in a banner placed near the video player, or in a popup window. However, viewers often perceive such advertisements as objectionable because they are distracting to the viewer and prevent the viewer from enjoying the requested content.

SUMMARY

A system, method, and computer readable storage medium is described for placing advertisements in a video. A video sharing host web site receives uploaded video content from a content provider. The video content is processed to determine ad surface parameters defining an ad surface. The ad surface comprises a spatio-temporal region of the video suitable for placement of an advertisement (e.g. a background region). The video sharing web site then stores the ad surface parameters and the uploaded video to a storage medium.

In one embodiment, a reviewer can access the uploaded video and receive a visual representation of the determined ad surfaces for the video. The reviewer can manually modify the ad surfaces. The modified ad surfaces are then stored in an ad surface database.

A viewer client device can request the shared video content from the video sharing web site. The video sharing web site receives the request and transmits the video and the ad surface parameters to the viewer client device. The video sharing web site also selects one or more advertisements for placement on the ad surfaces of the video and transmits the advertisements to the viewer client device. The viewer client device processes the video and advertisements at playtime to blend the advertisements with the ad surfaces defined by the ad surface parameters. By blending advertisements directly into background regions of the video, advertising content can be provided to the user in a manner that will be both effective for the advertiser and satisfying to the viewer.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A video sharing system places advertisements or other relevant information directly into a requested video. The video sharing system determines "ad surfaces" comprising low-interest or less informative regions of the video frames for placement of the advertisements. During playback, advertisements are overlaid on the ad surfaces. In one embodiment, advertisements and videos are processed to give the visual effect of the advertisement being a part of the video scene. For example, an advertisement can be blended with a video such that it appears as if the advertisement is on a wall or other background object in a video scene. Thus, advertisements are delivered to the viewer in a manner that does not distract the viewer from requested content.

Figure 1:
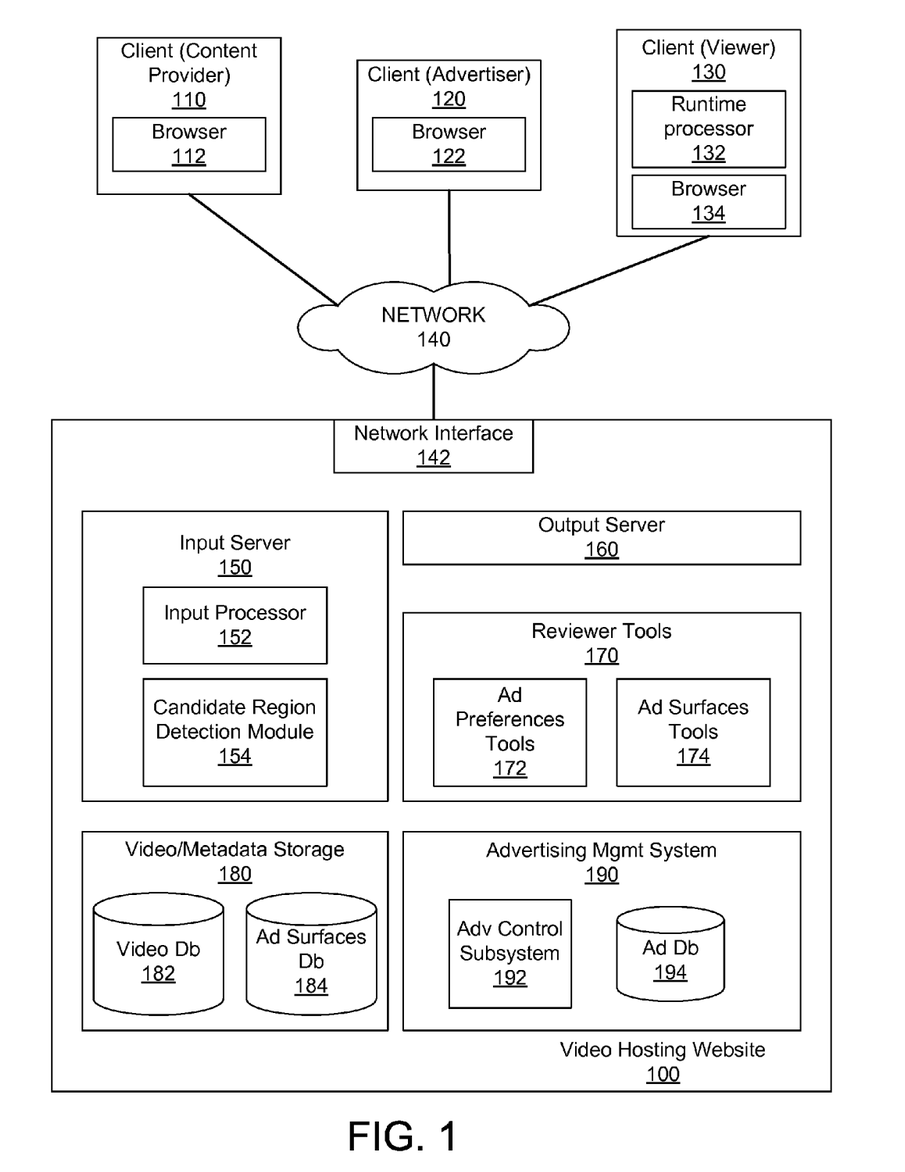
FIG. 1 illustrates an embodiment of a computing environment for placing advertisements in shared video content.

FIG. 1 is a block diagram of a video sharing system in accordance with an embodiment of the present invention. A video hosting website 100 communicates with a plurality of client devices 110, 120, 130 via a network 140 to facilitate sharing of video content between users. The video hosting website 100 includes a network interface 142, an input server 150, an output server 160, reviewer tools 170, a video/metadata storage 180 and an advertising management system 190. Other conventional features, such as firewalls, load balancers, application servers, failover servers, site management tools, and so forth are not shown so as to more clearly illustrate the features of the video hosting website 100. An example of a suitable website 100 is the YOUTUBE™ website, found at www.youtube.com. Other video hosting sites are known as well, and can be adapted to operate according to the teachings disclosed herein. The illustrated components of the video hosting website 100 can be implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the video hosting website 100, can also be performed by one or more clients 110, 120, 130 in other embodiments if appropriate.

Client devices 110, 120, 130 execute browser 112, 122, 134 respectively, and connects to the network interface 142 of the video hosting site 100 via a network 140. The network 140 is typically the Internet, but may also be any network, including but not limited to a LAN, a MAN, a WAN, a mobile wired or wireless network, a private network, or a virtual private network. The client devices 110, 120, 130 may comprise a personal computer or other network-capable device such as a personal digital assistant (PDA), a mobile telephone, a pager, a television "set-top box," etc.

Client devices coupled to the network 140 may include a content provider client 110, an advertiser client 120, and a viewer client 130. It is noted that one or more of the clients 110, 120, 130 may be the same client device adapted to perform one or more of content provider, advertiser, or viewer functions. Furthermore, while only one of each type of client 110, 120, 130 is shown, it is understood that very large numbers (e.g., millions) of clients are supported and can be in communication with the website 100 at any time.

The content provider client 110 can be any client device operated by a content provider to perform various content provider functions. Content provider functions may include, for example, uploading a video file to the video hosting website 100, editing a video file stored by the video hosting website 100, or editing content provider preferences associated with a video file. Typically, a content provider uploads and/or edits videos using a content provider user interface executed by the browser 112. For example, the content provider may use a web-based interface to upload or edit videos or preferences. Alternatively, the interface can be part of an application executing locally on the client 110.

The advertiser client 120 can be any client device operated by an advertiser to facilitate advertising functions. The advertiser client 120 can be used, for example, to upload advertisements to the video hosting website 100, edit advertisements, or edit advertiser preferences associated with the advertisements. An advertisement can be in the form of an image, video, text, hyperlinks, or a combination of formats. Typically, uploading and editing of advertisements and advertiser preferences is performed using a user interface executed by the browser 122.

The viewer client 130 can be any client device operated by a viewer to view video content stored by the video hosting site 100. The viewer client 130 may also be used to configure viewer preferences related to video content and advertisements. In some embodiments, the browser 134 includes an embedded video player such as, for example, the Flash™ player from Adobe Systems, Inc. or any other player adapted for the video file formats used in the video hosting website 100. The viewer client 130 may also include a runtime processor 132. The runtime processor 132 processes video and advertisement data during playback as will be described in more detail below.

A video uploaded to the video hosting site 100 from the content provider client 110 is received at the input server 150. The input server 150 includes an input processor 152 and a candidate region detection module 154. The input processor 152 performs general processing on an incoming video according to parameters defined by the video hosting website 100. For example, the input processor 152 may convert an uploaded video to a standard format, size, frame rate, etc. specified by the video hosting site 100. The input processor 152 may also generate metadata to be associated with the video such as, for example, title information, summary information, source information, date/time of upload, file size, or any other information relevant to the uploaded video. Uploaded videos and associated metadata are stored to a video database 182 in the video/metadata storage 180.

The candidate region detection module 154 detects candidate regions within a video as potential ad surfaces. A candidate region is generally an area of non-interest within the video such as, for example, a background area, or other region suitable for inserting an advertisement with little distraction to the viewer. For example, a background wall or stationary object in the video may provide a suitable candidate region for placing an advertisement. Alternatively, a candidate region may comprise a moving region. For example, the surface of a large moving object (e.g. a vehicle) may provide a suitable candidate region for placement of an advertisement.

A candidate region is typically defined in terms of both spatial and temporal coordinates of the video. Spatial coordinates of a candidate region may define a shape, size and location of the candidate region within the video frame. Temporal coordinates of the candidate region indicate a time period of the candidate region having a start time and end time. In one embodiment, the spatial coordinates defining the candidate region vary as a function of time. For example, a candidate region of a particular shape and size may be defined at a first location at a time $t_1$ and a second location at a time $t_2$. This is particularly useful for moving camera scenes where a suitable ad surface may have varying spatial coordinates from frame to frame. Ad surface parameters defining suitable ad surfaces are stored to the ad surfaces database 184 in association with the video. The ad surface parameters may include, for example, spatial coordinates, temporal coordinates, or blend parameters.

The reviewer tools 170 allow server administrators, content owners, and/or advertisers to review and/or manually modify ad surfaces stored in the ad surfaces database 184 or adjust various other ad preferences. Although the reviewer tools 170 are conceptually illustrated within the video hosting website 100, the reviewer functions can be executed remotely using the client devices 110, 120, 130. In one embodiment, the reviewer tools 170 comprise ad preferences tools 172 and ad surfaces tools 174. Using the ad surfaces tools 174, a reviewer can review and manually modify an ad surface. For example, in one embodiment, a graphical user interface allows a reviewer to review an uploaded video with the ad surface outlined in each frame. The reviewer can move or resize the ad surfaces associated with the video. The reviewer can also manually adjust the temporal coordinates associated with an ad surface to change the time period associated with the ad surface. For example, in one embodiment, the reviewer can specify a maximum length of time that an ad can be displayed on a particular surface. Furthermore, the reviewer can specify time portions of the video in which no advertisements should be displayed.

The ad preferences tools 172 allow a reviewer to manually select or edit ad preferences associated with a video in the video database 182. For example, a reviewer can select specific advertisements to be displayed. Alternatively, a reviewer can select preferences for types of advertisements to be displayed. At playtime, advertisements are automatically selected based in part on the reviewer preferences.

The reviewing tools 170 can also provide user interfaces to allow advertisers to purchase or rent ad surfaces for placement of advertisements. Alternatively, the user interface allows advertisers to bid on ad surfaces and the video hosting web site 100 then assigns the ad surface to the highest bidder. Particularly high quality ad surfaces (e.g., very large uniform surfaces) may be more valuable to advertisers than other surfaces, for example because they may be more likely to attract a viewer's attention. Therefore, the cost of the ad surface may be based on a predicted effectiveness of displaying an advertisement on the particular ad surface. In one embodiment, an advertiser may be able to select a time period in which to display the advertisement on a selected ad surface. For example, longer time periods may cost more. Ad surfaces may also cost different amounts depending on the time portion of the video in which the advertisement will be displayed. For example, portions at the beginning, middle, or end of the video may have different numbers of predicted viewers and may have therefore have different costs associated with purchasing the ad surface. Once an ad surface is purchased, rented, or otherwise assigned to an advertiser, that advertiser may then be able to override the suggested region for ad placement by moving or resizing the selected surface or modifying the time interval for the ad surface.

In one embodiment, an advertising management system 190 stores advertising content to be presented along with the requested content. The advertising content can be in the form of still images, videos, pure text, hyperlinks, or a combination of formats. An advertising control subsystem 192 both manages access to the advertising content stored in the advertising database 194, and also serves to associate certain advertising content with certain requested content or ad surfaces in storage 180. The associations between advertisements and ad surfaces for a particular video can be based on the content of the video; characteristics of the ad surfaces; preferences of the advertiser, the content owner, the viewer; or any combination of these factors.

The output server 160 outputs video content, ad surface parameters, and advertisements from the video hosting website 100 to the client device 130 for playback. In one embodiment advertisements are outputted to the client 130 for each of the ad surfaces prior to beginning playback of the video. Alternatively, ads are fetched for the next available ad surface while the video is being played back to smooth and lower the bandwidth usage.

In one embodiment, the runtime processor 132 of the client 130 performs blending operations to blend an advertisement onto an ad surface of the selected video. Alternatively, blending can be performed remotely at the video hosting website 100 and the pre-blended video outputted to the client 130 by the output server 160. In one embodiment, runtime processing by the runtime processor 132 includes choosing a suitable ad surface to blend with a particular advertisement from the multiple ad surfaces stored in association with the video. The advertisement and ad surface may be chosen based on preferences of the content owner of the video, preferences of the viewer, or both.

Figure 2:
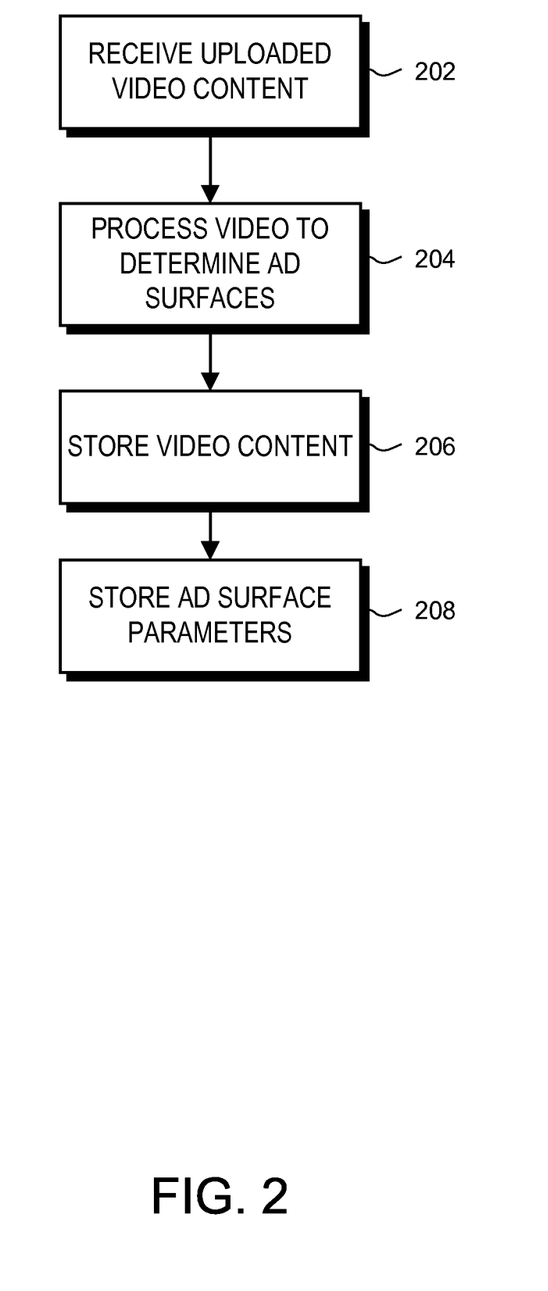
FIG. 2 illustrates an embodiment of a method for processing uploaded videos to determine ad surfaces suitable for placement of advertisements.

Turning now to FIG. 2, a flowchart illustrates an embodiment of a method for processing uploaded videos for placement of advertisements. The input server 150 receives 202 an uploaded video from the content provider client device 110 via the network 140. The input server 150 processes 204 the video to determine one or more suitable ad surfaces. An embodiment of a process for determining suitable ad surfaces is described in more detail below with reference to FIG. 5. The video content is stored 206 to the video database 182 and ad surface parameters defining the one or more ad surfaces are stored 208 to the ad surfaces database 184 in association with the video.

Figure 3:
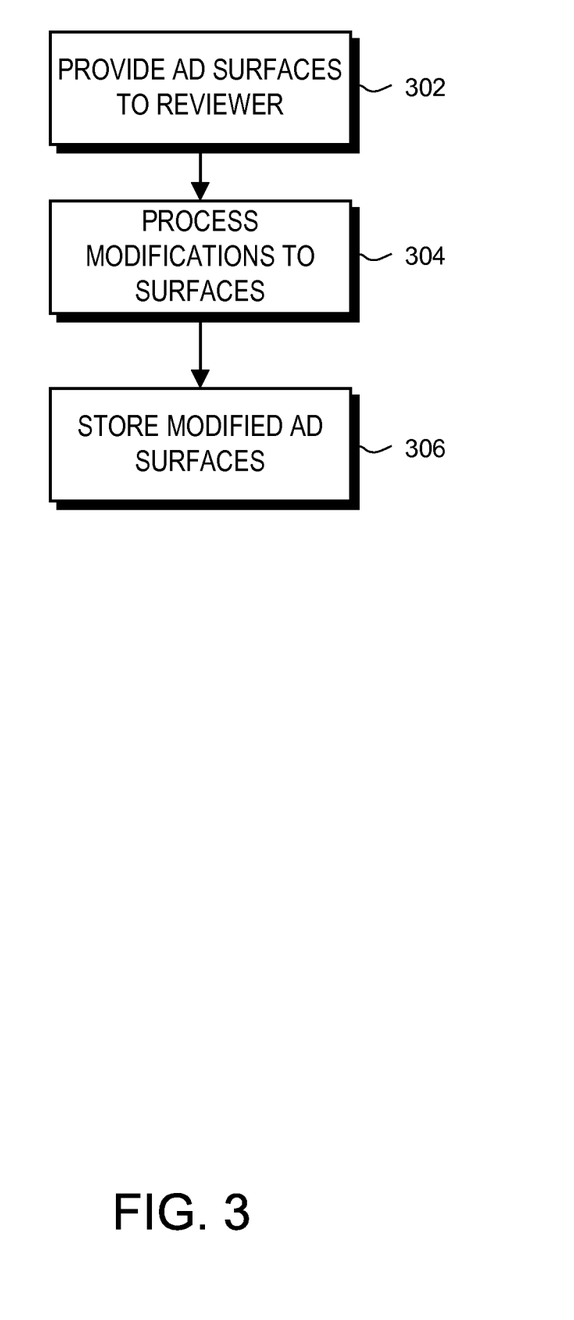
FIG. 3 illustrates an embodiment of a method for reviewing and modifying ad surfaces.

FIG. 3 illustrates a process for accessing and reviewing ad surfaces for the stored videos. Using the reviewer tools 170, the video hosting website 100 provides 302 a visual representation of the determined ad surfaces to the reviewer client device 120. For example, the visual representation may comprise frames of the video with outlines indicating the contour of the ad surface. If the reviewer makes changes to the ad surfaces, the video hosting web site 100 processes 304 the modifications to the ad surfaces. These changes can include, for example, moving, resizing, or rotating the ad surfaces. Additionally, changes may include selecting lengths of time that an ad can be displayed on a particular ad surface or specifying time portions of the video in which no advertisements should be displayed. The video hosting web site 100 then stores 306 the updated ad surfaces back to the ad surfaces database 184. In one embodiment, ad surfaces are not reviewed and only the automatically detected ad surfaces are used.

Figure 4:
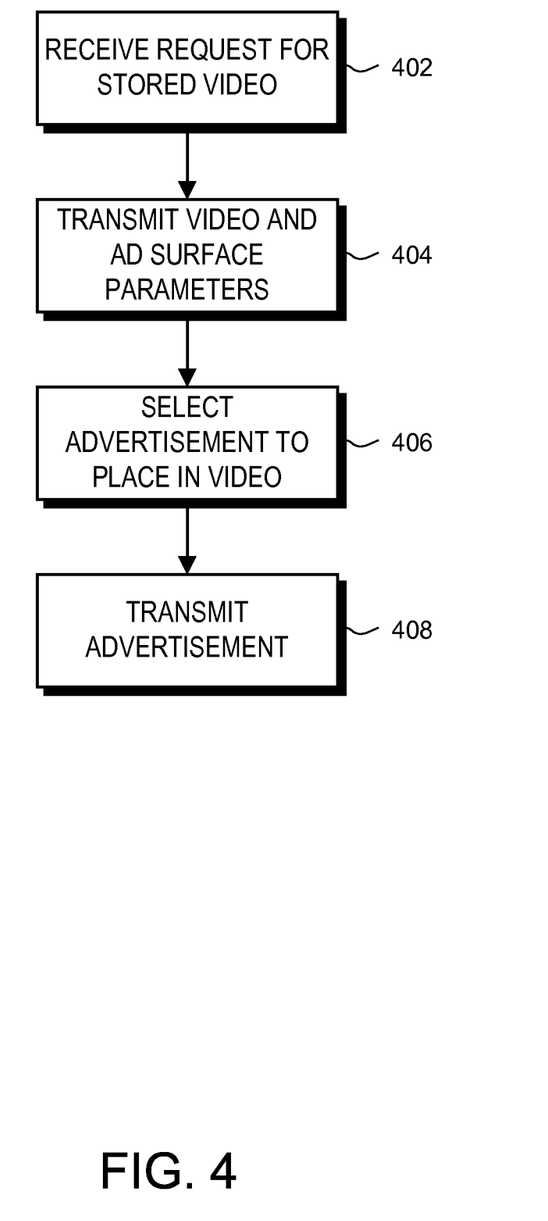
FIG. 4 illustrates an embodiment of a method for providing shared video content and advertisements to a viewer.

FIG. 4 illustrates a process for outputting videos and advertisements to a viewer. The video hosting web site 100 receives 402 a request for stored video content from the viewer client device 130. The output server 160 transmits 404 the video and associated ad surface parameters to the viewer client device 130. The advertisement control subsystem 192 then selects 406 an advertisement to be placed in the video from the advertisement database 194 and transmits 408 the advertisement to the viewer client device 130. Alternatively, the advertisement control subsystem 192 may select a plurality of advertisements to send to the viewer client device 130 and the viewer client device locally determines which advertisement to blend with which ad surface. In yet another embodiment, blending of the advertisement with the ad surface is performed by the video hosting web site 100 and the pre-blended video is transmitted to the viewer client 130.

Figure 5:
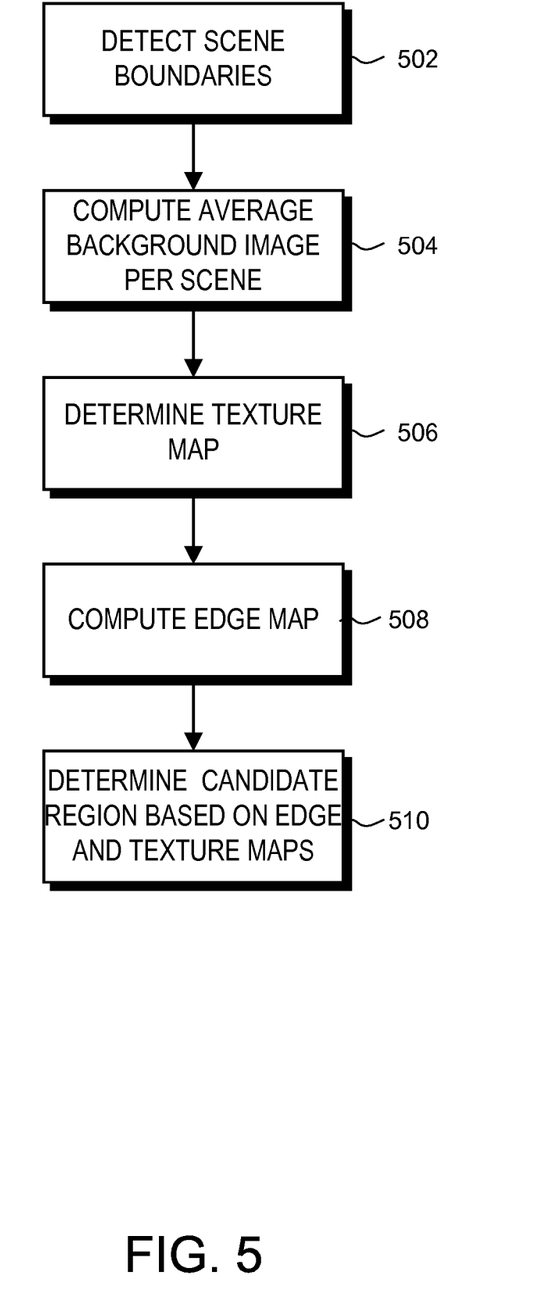
FIG. 5 illustrates an embodiment of a method for determining suitable ad surfaces in a video.

Referring next to FIG. 5, a flowchart illustrates an embodiment of a process for determining 204 ad surfaces suitable for ad placement in an uploaded video. The candidate region detection module 154 detects 502 scene boundaries in the video. A scene boundary is a temporal position in the video at the point of transition between two different scenes. A scene boundary can be, for example, an abrupt visual change such as when a video scene switches from one camera angle to another (i.e. a cut), a fade in which a scene slowly fades to black and a new scene begins, a dissolve in which a first scene slowly transitions into a scene shot, or any other type of transition between scenes.

In one embodiment, the candidate region detection module 154 performs a motion analysis to estimate the relative motion of pixels between frames. Scene boundaries are detected at the temporal locations where the relative motion is highest (i.e. local maxima). Various other techniques for detecting scene boundaries are well known in the art.

Figure 6:
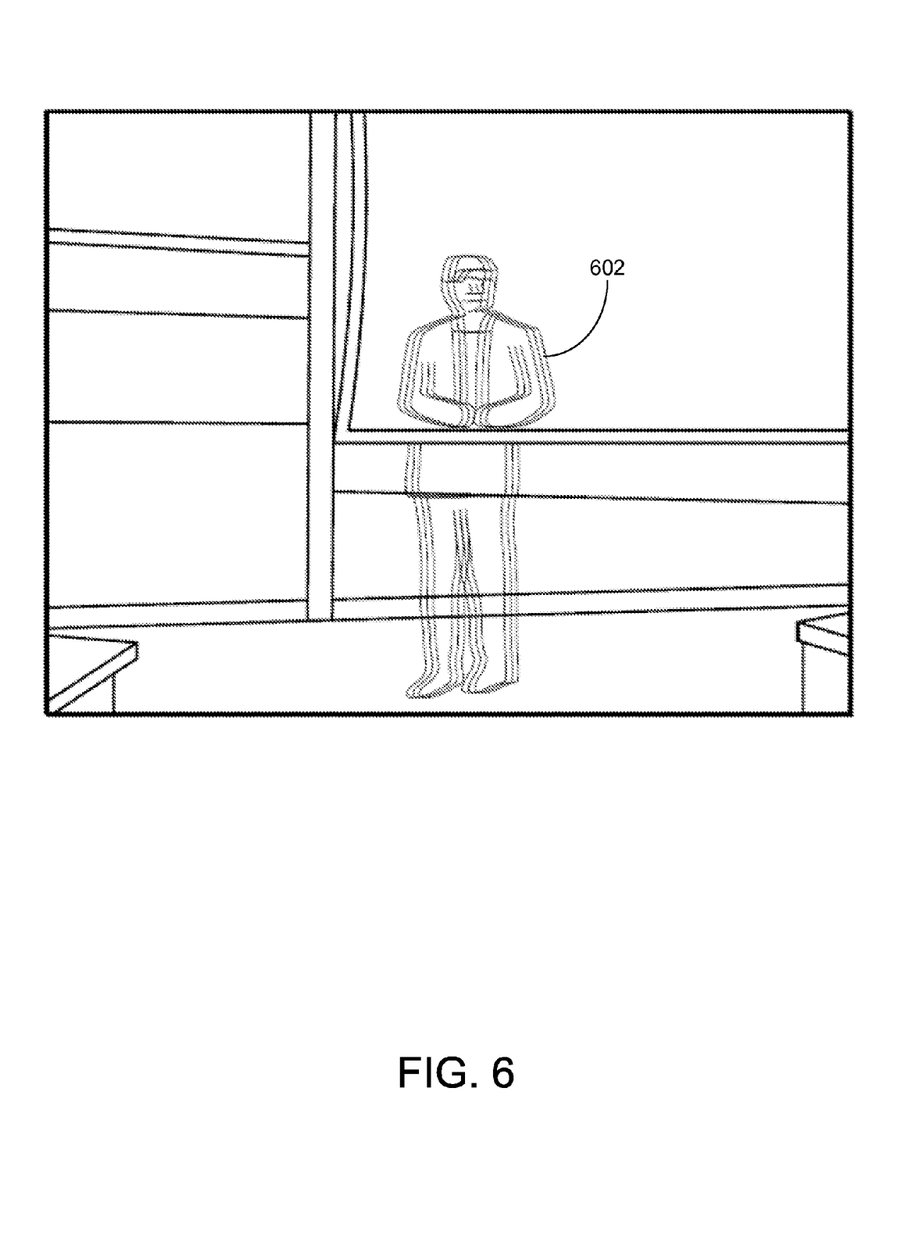
FIG. 6 illustrates an example of an average background image computed from a scene of video.

An average background image is then determined 504 for each scene (i.e. a set of frames between the detected boundaries). In one embodiment, the average background image is determined by separating foreground pixels and background pixels in each frame, and averaging the background pixels across the frames. Foreground/background segmentation can be implemented using various conventional techniques known in the art. One example technique for foreground/background segmentation is described in "Foreground Object Detection From Videos Containing Complex background" by Liyuan Li, et al., ACM-MM 2003, the content of which is incorporated by reference herein in its entirety. FIG. 6 is an example of an average background image computed from averaging background pixels across frames of a video scene. Note that a moving subject 602 in the frames appears blurred because the frames have been averaged.

Figure 7:
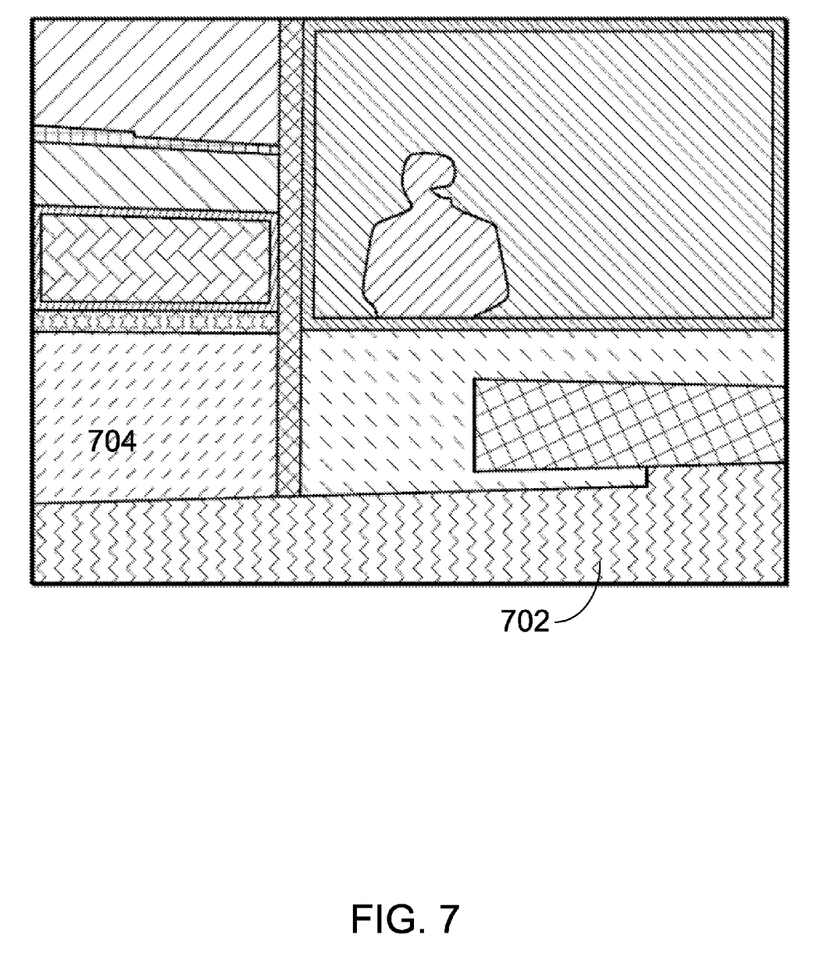
FIG. 7 illustrates an example of a texture map computed based on an average background image of a scene of video.

The candidate region detection module 154 then determines 506 a texture map using the average background image. The texture map divides the background image into spatial regions having similar texture. An example method for texture segmentation is described in "Efficient Graph-Based Image Segmentation" by P. Felzenszwalb and D. Huttenlocher, International Journal of Computer Vision, 59(2) September 2004, the content of which is incorporated by reference herein in its entirety. An example texture map is illustrated in FIG. 7 for the average background image of FIG. 6. In this example, each patterned area represents a region of the average background image having relatively consistent texture. For example, a floor region 702 is separated from a wall region 704 because different textures were discovered in the regions in the original background image.

Figure 8:
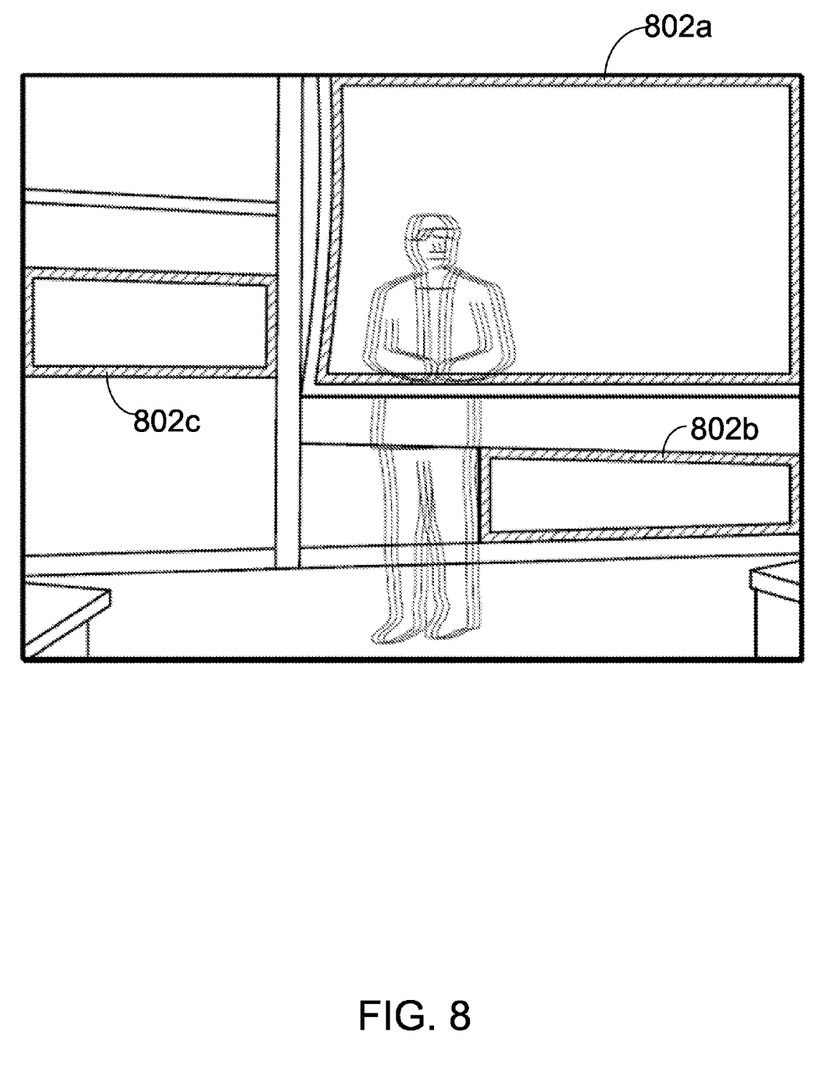
FIG. 8 illustrates an example of rectangle detection computed based on an average background image of a scene of video.

The candidate region detection module 154 also computes 508 an edge map based on the average background image. The edge map indicates the locations of edges within the average background image. Edge detection can be implemented using a number of conventional techniques known in the art, such as, for example, using a Canny edge detector. In one embodiment, the edge map is used to detect rectangles or other polygons in the average background image. To do this, the detected edges are examined to find contours of edges having convex shape and reasonable size (e.g., 1000 pixels in area). Each contour is approximated with a closed polygon. If a polygon has four sides and angles between adjacent sides are close to 90 degrees, then the spatial coordinates of the polygon is kept as a potential candidate region. FIG. 8 illustrates an example image showing some detected rectangles 802a-c for the average background image of FIG. 6.

Figure 9:
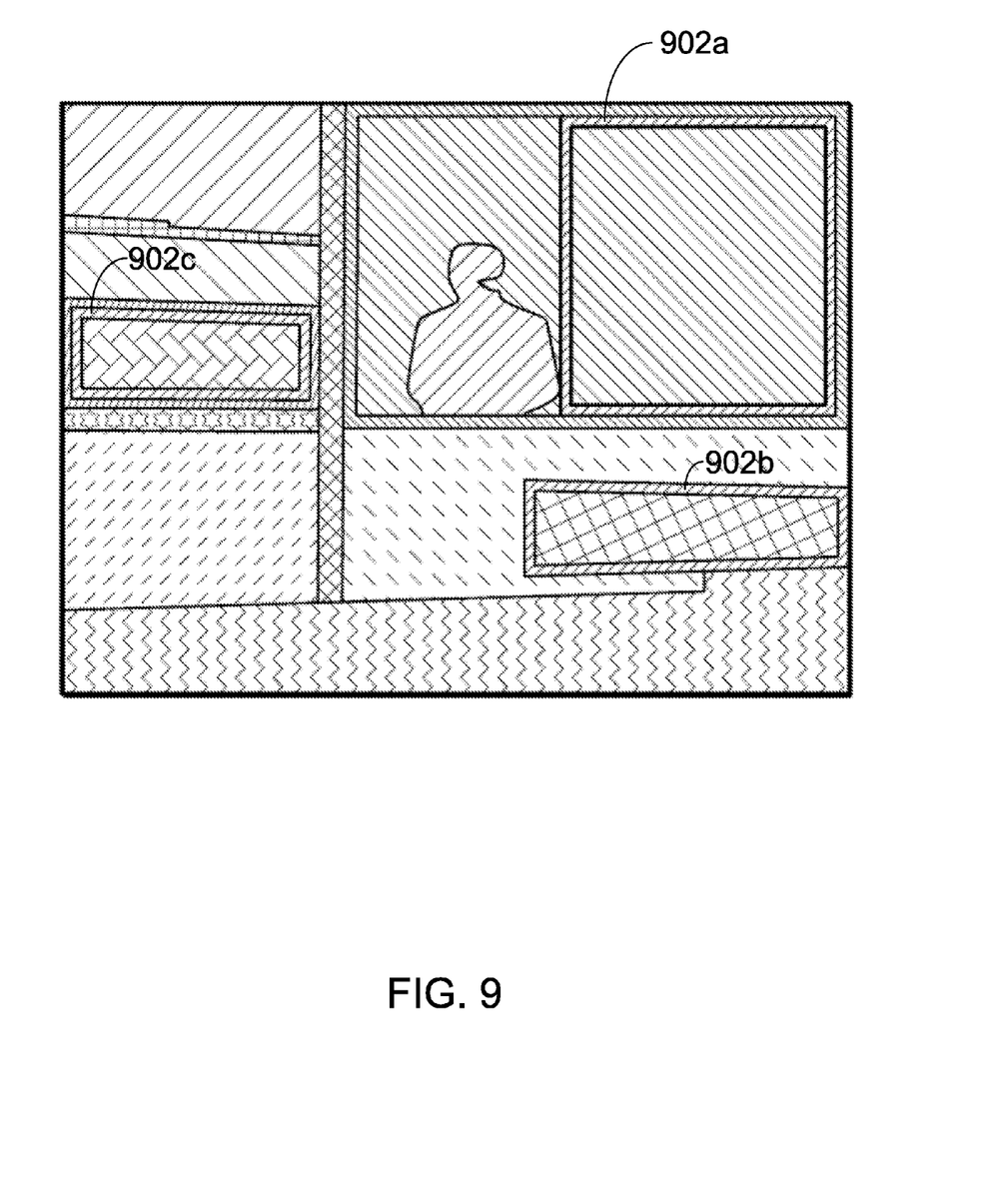
FIG. 9 illustrates an example of ad surfaces determined from an average background image of a scene of video based on rectangle detection and texture mapping.

The candidate region detection module 154 determines 510 candidate regions based on the edge map and texture maps. In one embodiment, the set of detected rectangles in the average background image are refined using texture information from the texture map. For example, a detected rectangle may be reduced in size so that only regions of uniform texture are contained within the resulting rectangle. Rectangles that are very small or have non-uniform texture throughout may be removed from the set of candidate regions. FIG. 9 illustrates an example image showing the set of candidate regions 902a-c based on information in the texture map of FIG. 7 and the detected rectangles of FIG. 8. Note that detected rectangle 802a has been reduced in size to include only regions of uniform texture as indicated by resulting candidate region 902a. Coordinates identifying these candidate regions 902 are stored to the ad surfaces database 184 as ad surfaces.

In alternative embodiments, the described technique for determining 510 candidate regions based on the edge map and texture map can be varied. For example, in one embodiment, shape contours (e.g., rectangles) are first detected based on the edge map. The detected polygons can then be filtered (i.e removing polygons from the set) or refined (i.e. modifying detected polygons) based on the textures within the polygons. Alternatively, the process may first segment the frame into regions based on the texture map, and then filter or refine the segments based on the edge map (e.g., according to various shape or size restraints). In addition, regions may be further refined according to motion constraints between frames.

In one embodiment, each ad surface is stored together with an ad surface score computed according to a set of heuristics. For example, in one embodiment, ad surfaces having low texture are scored higher than ad surfaces having regions of high texture. In another embodiment, ad surfaces located towards the outside of the frame are ranked higher because they are less likely to be a region of interest. In alternative embodiments, other criteria may be used for scoring ad surfaces.

As previously mentioned, suitable ad surfaces can also be detected in moving camera videos. In one embodiment, small camera motion can be detected by motion analysis. The video can then be stabilized with consecutive frame registration and candidate regions can then be detected using the method of FIG. 5 described above. For large camera motion, every frame of the scene can be separately processed. Then a motion map of the candidate region is determined by tracking the candidate region across frames. Furthermore, moving objects such as large vehicles, humans, etc. can provide moving surfaces suitable for ad placement.

Figure 10:
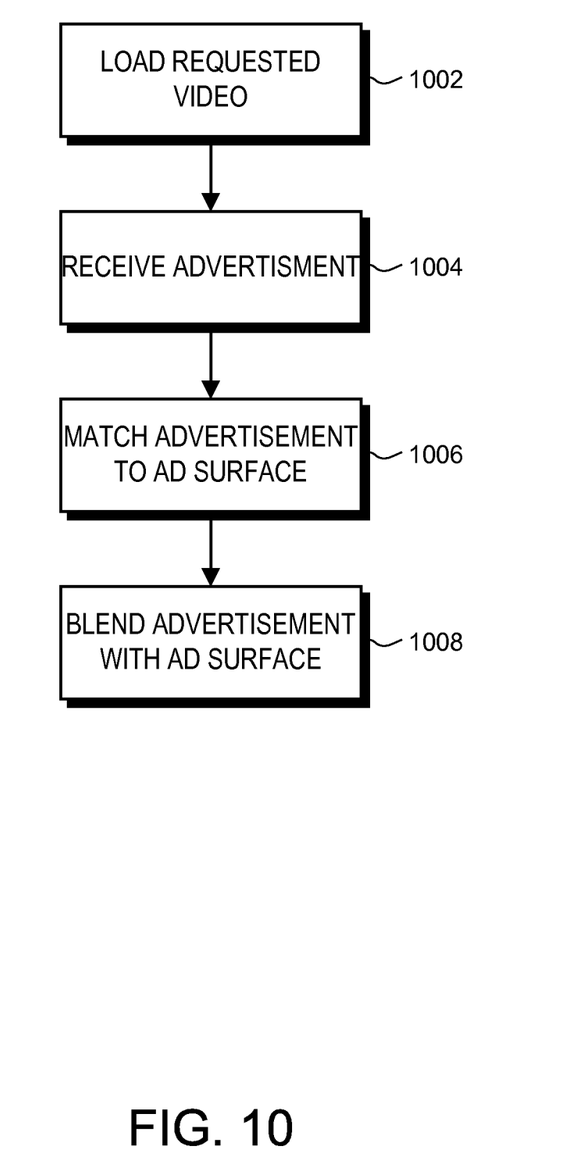
FIG. 10 illustrates an embodiment of a method for blending a video with an advertisement.

Turning now to FIG. 10 a process is illustrated for blending an advertisement with an ad surface of a video. Typically, the process is performed at runtime by the runtime processor 132. However, in alternative embodiments, the process may be executed by the video hosting web site 100 prior to transmitting the video to the client device 130. The runtime processor 132 of the viewer client 130 loads 1002 the requested video and metadata indicating the determined ad surfaces associated with the video. An advertisement is then received 1004 for placement in the video. In one embodiment, the advertisement is selected by the advertising control subsystem 192 from the advertising database 194 based on a variety of criteria as described above.

The advertisement is then matched 1006 to an ad surface of the video. In one embodiment, the advertisement is dynamically matched to an ad surface based on feature compatibility between the advertisement and the ad surface. For example, an advertisement may be matched to a particular ad surface to best match criteria such as shape, size, color, texture, aspect ratio, or transparency of the ad surface and advertisement. The runtime processor 132 then blends 908 the advertisement with the selected ad surface. For example, in one embodiment, the runtime processor 132 performs alpha blending. Additionally, the runtime processor 132 may alter the color balance, illumination, blurring, and noise of the advertisement to match the ad surface of the video.

In one embodiment, the complexity of the graphical blending is based in part on the current computational capacity of the client 130. For example, a simpler blending technique may be implemented if the client's computational capacity is currently low while a more complex blending technique may be implemented if the client's computational capacity is currently high. In another embodiment, the blending parameters dynamically change as the video regions change and/or the ad image (or video) changes in order to keep the quality of the blending at a high level.

The runtime processor 132 may further process the video and advertisement information to include occlusion handling. For example, in one embodiment, the ad image or video is made transparent for any pixels that are not part of the background image. Thus, if a foreground object temporarily moves in front of a background surface containing the advertisement, the object will remain in the foreground, temporarily occluding the advertisement. This makes the inserted advertisement appear as a natural part of the background scene. In one embodiment, the ad image or video can be perspective warped to make it look more in-scene. For example, a flat image may be perspective warped to match the angles and depth of the ad surface. This also adds to the natural appearance of the advertisement as part of the background scene in the video.

Figure 11:
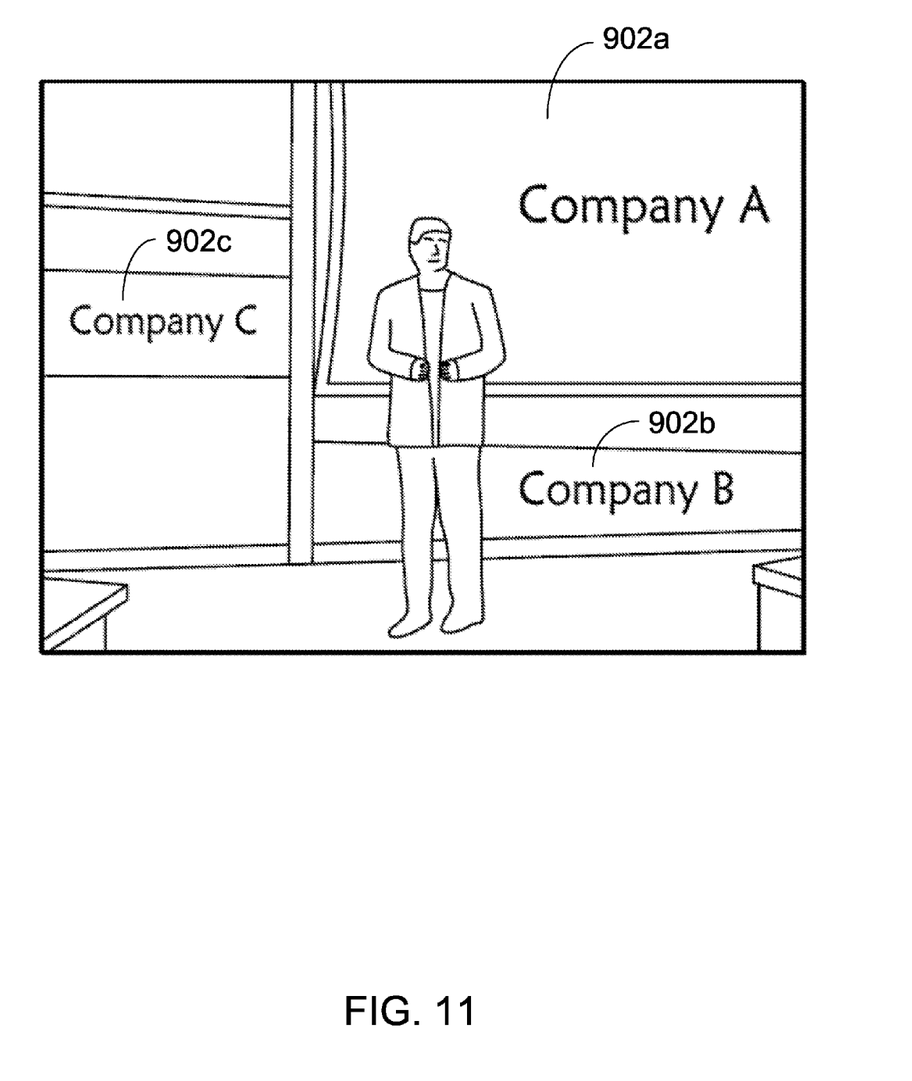
FIG. 11 illustrates an example of a video frame with advertisements placed on determined ad surfaces.

FIG. 11 is an example video frame of a processed video with inserted advertisements. In this example, three suitable ad surfaces 902 were detected on the background wall. Advertisement images are blended onto each of these surfaces so that the advertisements appear to be part of the scene. For example, advertisements for "Company B" and "Company C" are blended onto surfaces of the background wall. An advertisement for "Company A" is blended onto a wall hanging behind the individual in the foreground of the frame.

While the above embodiments are described in the context of advertisement delivery, the techniques described above are not limited to advertisements. Rather, the techniques can be used to place any information in the form of text, images, video, hyperlinks, etc. in a video. For example, in one embodiment, any information relevant to the video can be placed on the detected surfaces.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for placing advertisements in video, comprising:
   receiving via a web-based interface, a video from a content provider client device;
   detecting a scene of the video comprising a plurality of frames between consecutive scene boundaries;
   segmenting each frame of the scene into a foreground image and a background image;
   averaging pixels of the background images across the plurality of frames to determine an average background image for the scene;
   processing the video to automatically determine ad surface parameters based on appearance characteristics of the average background image, the ad surface parameters defining an ad surface comprising a spatio-temporal region of the video, the ad surface suitable for placement of an advertisement such that when the advertisement is blended with the ad surface, the advertisement appears as part of an object depicted in the video;

storing the video content and the ad surface parameters to a computer readable storage;

receiving a request from a viewer client device for the stored video;

transmitting the video to the viewer client device together with the ad surface parameters;

selecting an advertisement to deliver to the viewer client device for placement on the ad surface; and transmitting the advertisement to the viewer client device, wherein the viewer client device processes the advertisement and the video in accordance with the ad surface parameters to blend the advertisement with the ad surface.

2. The method of claim 1, wherein the advertisement is selected based on stored preferences of a user of the viewer client device.

3. The method of claim 1, wherein the advertisement is selected based on stored preferences of a content provider that provided the video.

4. The method of claim 1, wherein the advertisement is selected based on stored preferences of an advertiser that provided the advertisement.

5. The method of claim 1, further comprising:
transmitting a representation of the ad surface to a reviewer client device;
modifying the ad surface parameters responsive to receiving modifications from the reviewer client device; and
storing the modified ad surface parameters to the computer readable storage medium.

6. The method of claim 1, wherein the spatio-temporal region suitable for placement of the advertisement comprises a surface of a background object in the video.

7. The method of claim 1, wherein the spatio-temporal region suitable for placement of the advertisement comprises a time portion of the video having a start time and an end time.

8. The method of claim 1, wherein processing the video to automatically determine the ad surface parameters further comprises:
computing a texture map based on the average background image;
computing an edge map based on the average background image; and
determining the ad surface parameters based on the texture map and the edge map.

9. The method of claim 8, wherein determining the ad surface parameters based on the texture map and the edge map comprises:
detecting polygons in the average background image based on the edge map; and
refining the detected polygons in the average background image based on the texture map.

10. The method of claim 8, wherein determining the ad surface parameters based on the texture map and the edge map comprises:
detecting polygons in the average background image based on the texture map; and
refining the detected polygons in the average background image based on the edge map.

11. The method of claim 1, further comprising:
receiving a purchase request for the ad surface from an advertiser, wherein the ad surface has a cost based on a predicted effectiveness of displaying an advertisement on the ad surface; and
assigning the ad surface to the advertiser responsive to the purchase request.

12. The method of claim 1, further comprising:
determining a computational capacity of the viewer client device; and
selecting, responsive to the determined computational capacity, an blending technique for processing the advertisement and the video to blend the advertisement with the ad surface; and
providing an indication of the selected blending technique to the viewer client device, wherein the viewer client device is adapted to use the indicated blending technique to blend the advertisement with the ad surface.

13. The method of claim 1, wherein the viewer client device processes the advertisement and the video to blend the advertisement with the ad surface according to blending parameters, further comprising:
detecting a change in the ad surface or the advertisement; and
adjusting the blending parameters responsive to the detected change.

14. A non-transitory computer readable storage medium storing computer executable instructions for placing advertisements in video, the instructions when executed cause a processor to execute steps including:
receiving via a web-based interface, a video from a content provider client device;
detecting a scene of the video comprising a plurality of frames between consecutive scene boundaries;
segmenting each frame of the scene into a foreground image and a background image;
averaging pixels of the background images across the plurality of frames to determine an average background image for the scene;
processing the video to automatically determine ad surface parameters based on appearance characteristics of the average background image, the ad surface parameters defining an ad surface comprising a spatio-temporal region of the video, the ad surface suitable for placement of an advertisement such that when the advertisement is blended with the ad surface, the advertisement appears as part of an object depicted in the video;
storing the video content and the ad surface parameters to a computer readable storage;
receiving a request from a viewer client device for the stored video;
transmitting the video to the viewer client device together with the ad surface parameters;
selecting an advertisement to deliver to the viewer client device for placement on the ad surface; and
transmitting the advertisement to the viewer client device, wherein the viewer client device processes the advertisement and the video in accordance with the ad surface parameters to blend the advertisement with the ad surface.

15. The non-transitory computer readable storage medium of claim 14, wherein the advertisement is selected based on stored preferences of a user of the viewer client device.

16. The non-transitory computer readable storage medium of claim 14, wherein the advertisement is selected based on stored preferences of a content provider that provided the video.

17. The non-transitory computer readable storage medium of claim 14, wherein the advertisement is selected based on stored preferences of an advertiser that provided the advertisement.

18. The non-transitory computer readable storage medium of claim 14, the instructions when executed further cause the processing system to:
   transmit a representation of the ad surface to a reviewer client device;
   modify the ad surface parameters responsive to receiving modifications from the reviewer client device; and
   store the modified ad surface parameters to the computer readable storage medium.

19. The non-transitory computer readable storage medium of claim 14, wherein the spatio-temporal region suitable for placement of the advertisement comprises a surface of a background object in the video.

20. The non-transitory computer readable storage medium of claim 14, wherein the spatio-temporal region suitable for placement of the advertisement comprises a time portion of the video having a start time and an end time.

21. The non-transitory computer readable storage medium of claim 14, wherein processing the video to automatically determine the ad surface parameters further comprises:
   computing a texture map based on the average background image;
   computing an edge map based on the average background image; and
   determining the ad surface parameters based on the texture map and the edge map.

22. The non-transitory computer readable storage medium of claim 21, wherein determining the ad surface parameters based on the texture map and the edge map comprises:
   detecting polygons in the average background image based on the edge map; and
   refining the detected polygons in the average background image based on the texture map.

23. The non-transitory computer readable storage medium of claim 21, wherein determining the ad surface parameters based on the texture map and the edge map comprises:
   detecting polygons in the average background image based on the texture map; and
   refining the detected polygons in the average background image based on the edge map.

24. The non-transitory computer readable storage medium of claim 14, the instructions when executed further cause the processing system to:
   receiving a purchase request for the ad surface from an advertiser, wherein the ad surface has a cost based on a predicted effectiveness of displaying an advertisement on the ad surface; and
   assigning the ad surface to the advertiser responsive to the purchase request.

25. A system for placing advertisements in video, comprising:
   a network interface for receiving via a web-based interface, a video from a content provider client device;
   an input server for:
      detecting a scene of the video comprising a plurality of frames between consecutive scene boundaries;
      segmenting each frame of the scene into a foreground image and a background image;
      averaging pixels of the background images across the plurality of frames to determine an average background image for the scene; and
      processing the video to automatically determine ad surface parameters based on appearance characteristics of the average background image, the ad surface parameters defining an ad surface comprising a spatio-temporal region of the video, the ad surface suitable for placement of an advertisement such that when the advertisement is blended with the ad surface, the advertisement appears as part of the object depicted in the video;
   a storage module for storing the video content and the ad surface parameters;
   an output server for:
      receiving a request from a viewer client device for the stored video;
      transmitting the video to the viewer client device together with the ad surface parameters, and
      delivering a selected advertisement to the viewer client device for placement on the ad surface, wherein the viewer client device processes the advertisement and the video to blend the advertisement with the ad surface.

26. The system of claim 25, further comprising:
   an advertising management system for selecting the advertisement to deliver to the viewer client device for placement on the ad surface, wherein the viewer client device processes the advertisement and the video to blend the advertisement with the ad surface.

27. The system of claim 25, wherein the spatio-temporal region suitable for placement of the advertisement comprises a surface of a background object in the video.

28. The system of claim 25, further comprising:
   reviewer tools for delivering a representation of the ad surface to a reviewer for reviewing, and for receiving manual modifications to the ad surface from the reviewer.

* * * * *